United States Patent
Yomazzo et al.

(10) Patent No.: US 7,582,238 B1
(45) Date of Patent: Sep. 1, 2009

(54) SURFBOARD

(76) Inventors: Michael J. Yomazzo, 21 Kent Rd., Newtown, CT (US) 06470; Mark Yomazzo, 568 Second Ave., Apt. 2, New York, NY (US) 10022

(*) Notice: Subject to any disclaimer, the term of this patent is extended or adjusted under 35 U.S.C. 154(b) by 440 days.

(21) Appl. No.: 11/031,810

(22) Filed: Jan. 7, 2005

Related U.S. Application Data

(60) Provisional application No. 60/535,386, filed on Jan. 9, 2004, provisional application No. 60/565,706, filed on Apr. 27, 2004, provisional application No. 60/535,387, filed on Jan. 9, 2004.

(51) Int. Cl.
  *B28B 1/20* (2006.01)
  *B63B 35/79* (2006.01)
(52) U.S. Cl. ............... 264/45.7; 264/311; 264/310; 441/74
(58) Field of Classification Search ........... 264/45.7, 264/311, 310; 441/74
  See application file for complete search history.

(56) References Cited

U.S. PATENT DOCUMENTS

| | | | | |
|---|---|---|---|---|
| 3,308,493 A * | 3/1967 | Lambach | .................. | 441/74 |
| 3,323,154 A * | 6/1967 | Lambach | .................. | 441/74 |
| 3,802,010 A * | 4/1974 | Smith | .................. | 441/74 |
| 3,875,275 A * | 4/1975 | Lemselson | .................. | 264/45.3 |
| 3,965,514 A * | 6/1976 | Shafer et al. | .................. | 441/79 |
| 4,065,337 A | 12/1977 | Alter et al. | .................. | 156/78 |
| 4,457,729 A * | 7/1984 | Peerlkamp | .................. | 441/74 |
| 4,477,400 A | 10/1984 | Peerlkamp | .................. | 264/45.7 |
| 4,533,696 A | 8/1985 | Schrijver et al. | .................. | 524/528 |
| 4,798,549 A * | 1/1989 | Hirsch | .................. | 441/74 |
| 4,846,745 A * | 7/1989 | Lobe | .................. | 441/79 |
| 4,904,215 A * | 2/1990 | Sherwood | .................. | 441/79 |
| 5,094,607 A | 3/1992 | Masters | .................. | 425/429 |
| 5,106,331 A * | 4/1992 | Lizarazu | .................. | 441/55 |
| 5,260,381 A * | 11/1993 | Needham | .................. | 525/193 |
| 5,618,215 A * | 4/1997 | Glydon | .................. | 441/65 |
| 5,700,174 A * | 12/1997 | Churchill et al. | .................. | 441/65 |
| 5,830,392 A * | 11/1998 | Strebel | .................. | 264/45.7 |
| 5,928,584 A * | 7/1999 | Lee et al. | .................. | 264/45.7 |
| 6,068,531 A * | 5/2000 | Patterson | .................. | 441/74 |
| 6,561,118 B2 | 5/2003 | Mead | .................. | 114/357 |
| 6,800,006 B1 * | 10/2004 | Itnyre et al. | .................. | 441/74 |

\* cited by examiner

*Primary Examiner*—Matthew J. Daniels
(74) *Attorney, Agent, or Firm*—Harrington & Smith, PC

(57) ABSTRACT

A method for forming a surfboard is provided. The method comprises adding a polyethylene mixture into a mold having one or more ventilation holes located therein. The polyethylene mixture comprises a blend of a polyethylene material and a foaming agent. The polyethylene material is in a form comprising at least one of a powder form, a pellet form and mixtures thereof. In addition, the method comprises heating the polyethylene mixture in the mold while rotating the mold for a pre-determined period of time and at a predetermined temperature. Further, the method also comprises cooling the mold for a predetermined amount of time, and wherein either a main body of a surfboard or an entire surfboard is then formed.

14 Claims, 4 Drawing Sheets

FIG. 1
FIG. 2
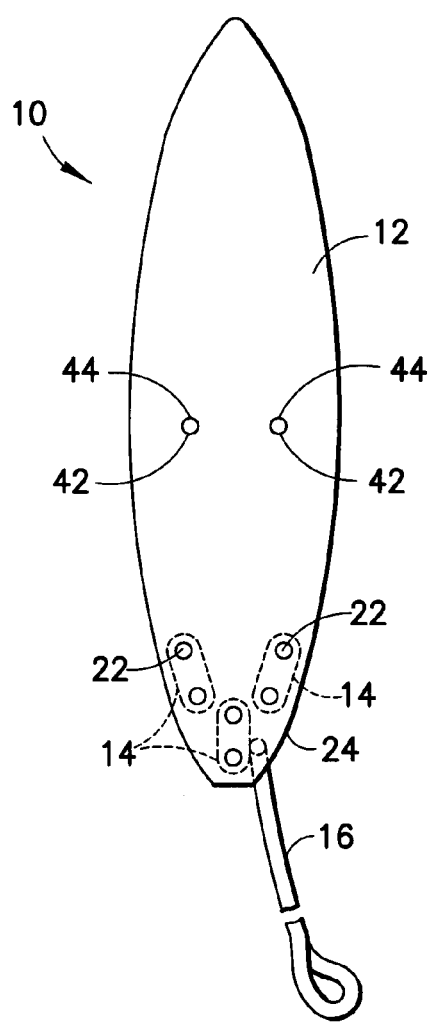
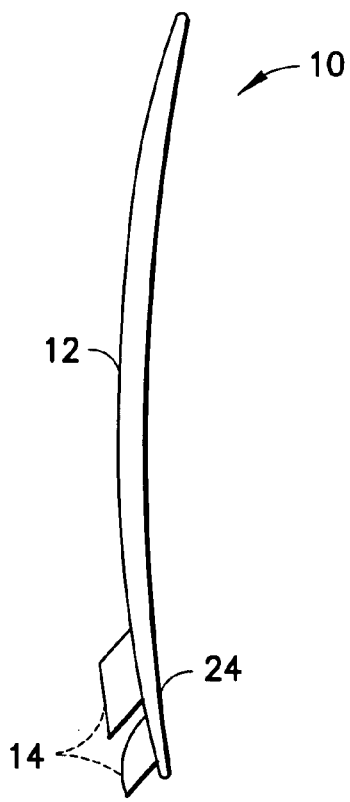
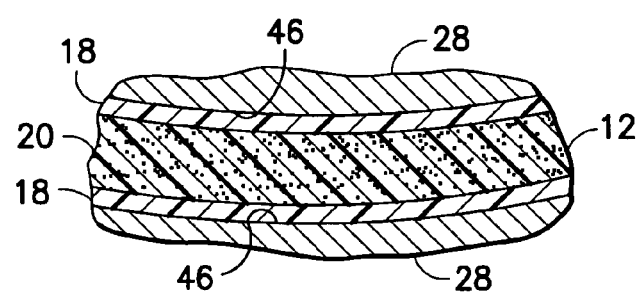
FIG. 5

SURFBOARD

CROSS-REFERENCE TO RELATED APPLICATIONS

This application claims priority under 35 U.S.C. §119(e) to U.S. Provisional Application Ser. No. 60/535,386, filed Jan. 9, 2004, U.S. Provisional Application Ser. No. 60/565,706, filed Apr. 27, 2004 and U.S. Provisional Application Ser. No. 60/535,387, filed Jan. 9, 2004. The disclosures of these applications are all hereby incorporated by reference in their entirety herein.

BACKGROUND OF THE INVENTION

1. Field of the Invention

The present invention relates to surfboards and, more particularly, to a process for manufacturing a surfboard.

2. Brief Description of Prior Developments

Surfboards, methods for manufacturing surfboards and the materials commonly used in the manufacturing process are all well known in the art. For Example, U.S. Pat. No. 6,561,118 B2 ("the '118 patent") describes one type of method of molding a surfboard, using flexible male/female molds. In particular, the '118 patent describes methods of high-strength sandwich skin fabrication using the thickness of a high-density foam skin core to mask minor imperfections on the surface of a mold, thereby allowing the mold to be divided into separate parts that have the capacity to be moved, then fixed and set, so as to describe different curves or modify dimensions of the surfboard. Further, in the '118 patent, The mold is described as being reversible and male/female configurations permit fabrication of a wide array of custom designs.

U.S. Pat. No. 4,477,400 ("the '400 patent") discloses a rotational molding method using powder compositions. In particular, the '400 patent describes a polyolefin composition comprising an intimate mixture of about 20% to about 99.5% by weight of a first stabilized polyolefin powder and from about 0.5% to about 80% by weight of a second at most slightly stabilized polyolefin powder. The second powder has a crystalline melting point which is at least 1° higher than that of the first powder and also wherein the second powder has the ability to be oxidized under process conditions.

U.S. Pat. No. 4,533,696 ("the '696 patent") describes polymer powder compositions, particularly polyethylene powder compositions, consisting of 1-99 wt. % of a polymer powder component A and 99-1 wt. % of a polymer powder component B. The average particle size of component A being smaller than that of component B. In addition, the '696 patent describes the preparation of hollow objects by rotational molding using these polymer powder compositions.

However, in spite of the above developments, there is still a strong need in the art for surfboards which are produced with improved mechanical properties, such as rigidity and impact strength, as compared to conventional surfboards. Further, there is also a strong need in the art for methods which economically and efficiently form a surfboard having the above properties. The present invention accomplishes the above needs in the art and also provides other advantages, as will be described in detail below.

SUMMARY OF THE INVENTION

In accordance with an aspect of the present invention, a method for forming a surfboard is provided. The method comprises adding a polyethylene mixture into a mold having one or more ventilation holes located therein. The polyethylene mixture comprises a blend of a polyethylene material and a foaming agent. The polyethylene material is in a form comprising at least one of a powder form, a pellet form, a micropellet form and mixtures thereof. In addition, the method comprises heating the polyethylene mixture in the mold while rotating the mold for a pre-determined period of time and at a predetermined temperature. Further, the method also comprises then cooling the mold for a predetermined amount of time, and wherein either a main body of a surfboard or an entire surfboard is then formed.

In accordance with another aspect of the present invention, a method of forming a surfboard using a two-shot rotational molding process is provided. The method comprises adding a first polyethylene material into a mold having one or more ventilation holes located therein. The method further comprises heating the first polyethylene material in the mold while rotating the mold for a pre-determined period of time and at a predetermined temperature to form a skin layer. The first polyethylene material being in a form comprising at least one of a powder form, a pellet form, a micropellet form, and mixtures thereof. Additionally, the method comprises adding a polyethylene mixture into the mold, wherein the polyethylene mixture comprises a blend of a second polyethylene material and a foaming agent. The second polyethylene material being in a form comprising at least one of a powder form, a pellet form, a micropellet form, and mixtures thereof. Further, the method also comprises heating the polyethylene mixture inside the mold while rotating the mold for a predetermined period of time and at a predetermined temperature to produce a foam core. Moreover, the method comprises cooling the mold for a predetermined amount of time and wherein either a main body of a surfboard or an entire surfboard is then formed.

In accordance with yet another aspect of the present invention, a light weight, substantially rigid surfboard is provided. The surfboard comprises a main body, which in turn comprises an outer layer and an inner core bonded to one another. The outer layer is substantially solid and has substantially no air voids therein and the inner core is of a general foam shape with air voids therein. Moreover, the outer layer and the inner core are formed of substantially the same polyethylene material as one another. In addition, the surfboard also comprises one or more fins associated with the main body of the surfboard.

BRIEF DESCRIPTION OF THE DRAWINGS

The foregoing aspects and other features of the present invention are explained in the following description, taken in connection with the accompanying drawings, wherein:

FIG. 1 is a top plan view of a surfboard in accordance with a first embodiment of the present invention;

FIG. 2 is a side elevational view of the surfboard shown in FIG. 1;

FIG. 5 is a partial cross sectional view of the main body of the surfboard shown in FIG. 1 shown inside the mold shown in FIG. 3;

DETAILED DESCRIPTION OF THE INVENTION

Figure 3:
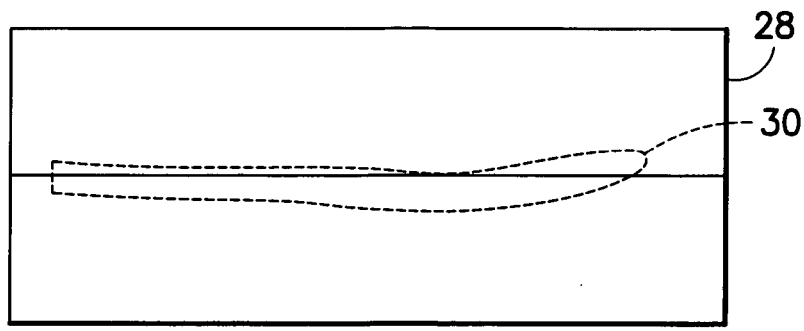
FIG. 3 is a side elevational view of a mold used to form the main body of the surfboard shown in FIG. 1.

The present invention provides a substantially rigid, lightweight surfboard with good thermal insulation properties and other advantages as compared to conventional surfboards. Moreover, the present invention produces the above improved surfboard using economical and efficient methods such as a one shot/step rotational molding method or alternatively a two step/shot rotational molding method. The above methods and products of the present invention will be described in detail below.

Referring to FIGS. 1-6, a first embodiment of the present invention will be described. Referring specifically to FIG. 1 there is shown a top plan view of a surfboard 10 incorporating features of the present invention. Although the present invention will be described with reference to the exemplary embodiment shown in the drawings, it should be understood that the present invention can be embodied in many alternate forms of embodiments. In addition, any suitable size, shape or type of elements or materials could be used.

Referring now to FIG. 2, the surfboard 10 generally comprises a main body 12 and fins 14. The surfboard 10 can also comprise an optional leash 16. Referring also to FIG. 5, the main body 12 generally comprises an outer layer or cover 18 and an inner core 20. The outer cover 18 and the inner core 20 are preferably comprised of a same plastic or polymer material. The outer cover 18 is substantially solid and contains substantially no air voids. Thus, the outer cover 18 forms a rigid outer cover for the main body. The inner core 20 has a general foam shape with air voids in the plastic. Moreover, as will be described in more detail below, the outer cover 18 and the inner core 20 of the surfboard 10 may either be formed at substantially the same time, e.g. in a one-shot rotational mold process or in two separate steps, e.g. in a two-shot rotational mold process.

Figure 6:
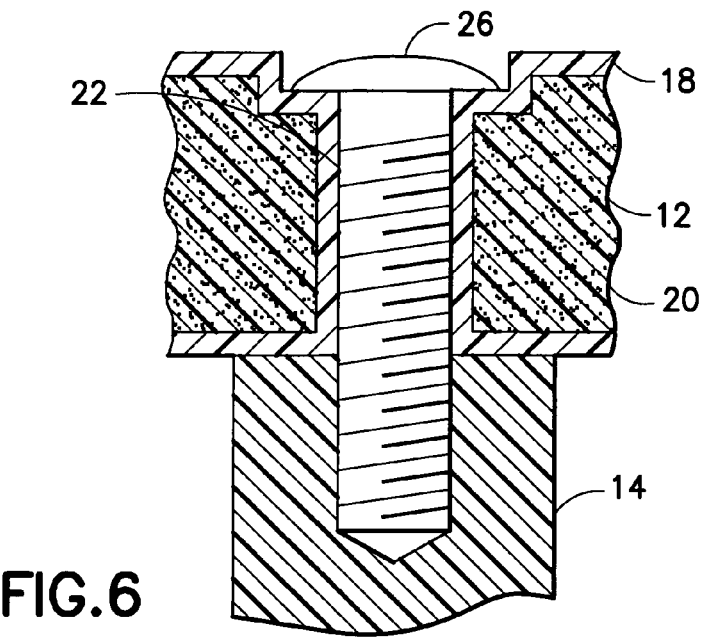
FIG. 6 is a partial cross sectional view of the surfboard showing the connection of one of the fins to the main body.
Figure 7:
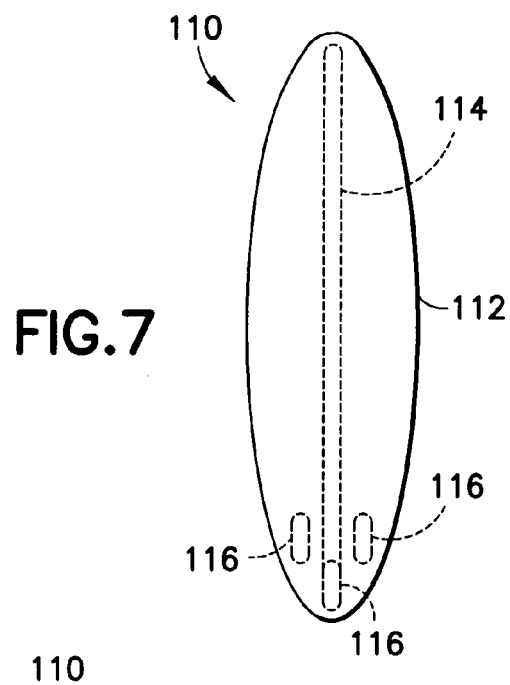
FIG. 7 is a top plan view of a surfboard in accordance with a second embodiment of the present invention.

The main body 12 includes holes 22 which extend through the main body 12 between the top side and the bottom side. The holes 22 are located at the rear end 24 of the main body. Referring also to FIG. 6, the holes 22 are provided for fasteners 26 to attach the fins 14 to the main body 12. In the embodiment shown, the main body comprises six of the holes 22; two holes for each of the three fins 14. In alternate embodiments, the main body could comprise more or less than six holes and the surfboard could comprise more or less than three fins. Two of the fasteners 26 are provided for each one of the fins 14. The fasteners 26 extend through the holes 22 and screw into the top ends of the fins 14. The fins 14 can, thus, be fixedly and stationarily attached to the bottom side of the main body 12 at the rear end 24. In addition, any suitable system for attaching the fins to the main body could be provided. For example, fins may also be attached via a fin box system, where the fin box is a receptacle and the fins attach thereto. The mold may need to be modified to accept the fin system. Similarly, a removable fin system may also be employed.

The main body 12 is preferably comprised of polyethylene (PEB) plastic foam. In particular, the main body is constructed to consist of an outer skin 18 and an inner foam core 20. The outer skin 18 is made preferably from Ultraviolet (UV) resistant polyethylene material containing a color agent, if desired. The inner foam core 20 is produced preferably from closed cell polyethylene.

As mentioned above, the surfboard 10 of the first embodiment may be manufactured in different ways in accordance with the present invention. For example, one preferred method of manufacturing the surfboard is to form the outer cover 18 and the inner core 20 of the surfboard and if also desired one or more fins as well at substantially the same time, as described below. This method is known as a one-shot rotational molding process. With this method, one may manufacture an entire surfboard from the same basic material, such that it can be molded in a single process during which the materials bond together to yield a single unit.

In particular, this one-shot or single rotational molding process method comprises providing a mold 28 which is provided to contain the shape of the surfboard. The mold 28, as seen in FIG. 3, is preferably comprised of a heat conductive material, such as aluminum. In a preferred embodiment, the mold 28 comprises a general clamshell shape forming an interior cavity 30. The interior cavity 30 has the size and shape of the main body 12.

Once the mold 28 is in place, a correct weight of a powdered, pelletized, and/or micropelletized polyethylene material and a foaming agent are mixed or blended together to form a polyethylene mixture. This polyethylene mixture is then added to the mold 28 inside the interior cavity 30. Preferably, this polyethylene mixture includes a UV resistant polyethylene material to form the outer shell 18 and to provide color if desired and a closed cell polyethylene material (foaming agent) to produce the inner foam core 20. Suppliers of the materials employed in the processes describe herein may include companies such as Chroma, A. Schulman, Dow, DuPont, ICO Polymers and Ingenia Plastics.

Figure 4:
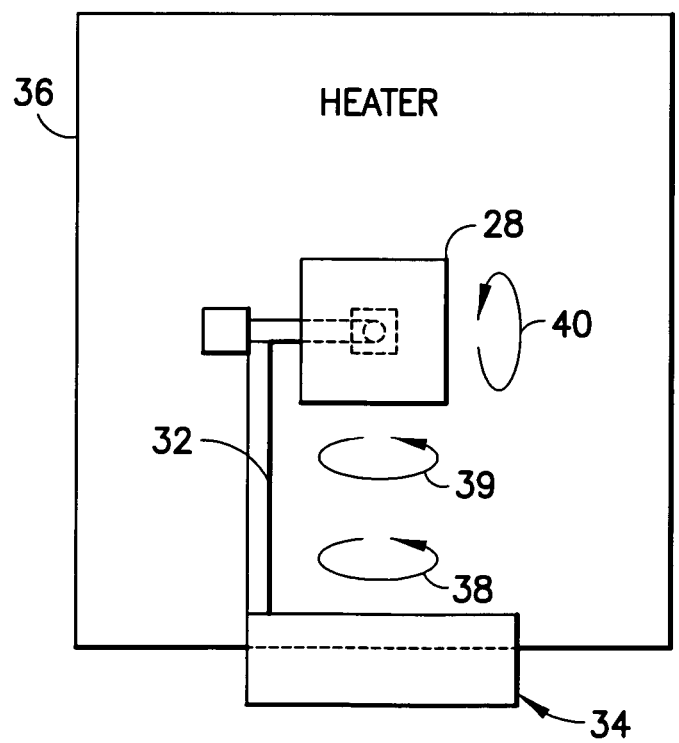
FIG. 4 is a diagrammatic view of a heating system used with the mold shown in FIG. 3 to form the main body of the surfboard shown in FIG. 1.

Referring now to FIG. 4, the mold 28 is coupled to an arm 32 of a rotary molding machine 34 having a heater or oven 36 which heats the mold 28 and, thus, heats the polyethylene mixture (e.g. combination of UV resistant polyethylene material and closed cell polyethylene material) while simultaneously rotating the mold 28 on several axes 38, 39, 40 to ensure proper disposition and bonding of the polyethylene. The mold is preferably heated to a temperature preferably in the range of about 525° F. to about 625° F. on the exterior of the mold 28 exterior to produce a temperature preferably in the range of about 380° F. to about 450° F. inside of the mold. The mold 28 is preferably heated and rotated for a period of approximately 20-30 minutes and then cooled while stationary for approximately 20-30 minutes. Other suitable temperatures and times may also be employed to form the rigid outer cover 18.

When the temperature of the material inside of the mold reaches the desired level, it causes a chemical reaction in the foaming agent, releasing gases that cause the polyethylene to expand and form a high strength foam-like structure. The temperature at which this reaction occurs depends upon the type of blowing or foaming agent used.

Further, in order to relieve the pressure and gasses produced in the mold 28, several ventilation holes are incorporated into the mold 28. The ventilation holes are preferably located in the middle of the interior cavity 30 and result in ventilation holes 42 being formed in the main body 12 as shown in FIG. 1. Vent caps 44 are preferably inserted into the vent holes 42 after the main body is removed from the mold to thereby seal the vent holes. Other venting methods may also be used in accordance with the present invention.

The surfboard of the first embodiment of the present invention depicted in FIGS. 1, 2 and 6 includes removable fins 14 and the mold incorporates an attachment system as part of the mold design. The fins may be attached using threaded screws and removed by reversing the process. However, as mentioned above, the fins 14 alternatively may be formed integrally with the main body 12 of the surfboard 10 in mold 28. Moreover, as mentioned, any suitable system for attaching the fins 14 to the main body 12 could be provided. Further, a separate hole can be incorporated in the surfboard to accommodate the safety leash 16 which can be supplied with the surfboard. Other leash plug systems may also be employed in accordance with the present invention.

The surfboard is then removed from the mold and allowed to cure before packaging. Graphics and decorations may be added in the mold 28 or after the surfboard 10 or main body 12 is molded. Final finishing (e.g. sanding, alignments, etc.) may be needed after molding. The surfboard 10 will then preferably go through quality control and packaging.

As is apparent from the present disclosure, the main body 12 of the surfboard or the entire surfboard 10 itself may be formed using the single shot roto-molded process described above. A more specific understanding of how the one-shot process achieves the above results is illustrated in FIGS. 4-6 and discussed in detail below. In particular, referring to FIG. 5, during the heating process the outer layer or cover 18 is formed at substantially the same time as the formation of the inner core 20. Because the temperature inside the mold is hotter along the interior sides 46 of the mold the cover 20 is formed without substantial air voids. However, because the temperature inside the mold spaced from the interior sides of 46 is slightly cooler and pelletized material is used, the inner core 20 is formed with air voids into a general solidified foam shape.

The outer layer 18, although comprised of the same material as the inner core 20, is formed denser and harder then the inner core because of its powdered form. The resulting product allows the main body 12 to be substantially rigid. The bond between the inner core 20 and the outer layer 18 is extremely good because of the facts that the inner core 20 and outer layer 18 are comprised of the same material and are formed at the substantially same time. Because the inner core 20 and outer layer 18 are formed at the same time and attached to each other at the same time, the main body 12 is easier to manufacture and less expensive to manufacture than conventional two-part surfboards. Rotating the mold during heating causes a majority of the powered form of the polyethylene material to be distributed at the exterior of the main body and the pelletized polyethylene material to be located inside. Gravity allows the pellets to fall away from the sides 46 while the powered material can stay attached. The steam produced during heating can be vented while the pellets expand and bond to each other and to the powder; the power being located along the sides 46 of the mold.

Alternatively, a second preferred method which may be used in accordance with present invention to manufacture the surfboard 10 of the first embodiment comprises forming the outer cover 18 and inner core 20 in two separate steps using a two-shot rotational molding process, instead of in the same step as described above. More specifically, this second method is essentially the same as the first method for forming the surfboard described above, except that during the heating process the outer layer or cover 18 is initially formed in a first step prior to the formation of the inner core 20, which is formed in a second step. This two-shot or two step rotational molding process will be described in further detail below.

First, a desired weight of powdered, pelletized, and/or micropelletized polyethylene material is preferably added to the mold inside the interior cavity 30. The amount of material again depends upon the size of the mold and the desired wall thickness of the skin layer or cover 18. This material again preferably includes a UV resistant polyethylene material to form the outer cover 18 or skin layer and to provide color, if desired.

Referring to FIG. 4, the mold 28 is coupled to an arm 32 of a rotary molding machine 34 having a heater or oven 36, which heats the mold 28 and thus heats the polyethylene material while simultaneously rotating the mold 28 on several axes 38 for a predetermined amount of time. In particular, the mold may be heated to a temperature preferably in the range of about 525° F. to about 625° F. on the exterior of the mold 28 to produce a temperature preferably in the range of about 380° F. to about 450° F. inside of the mold. The mold 28 may be heated and rotated for a period of approximately 20-30 minutes. Other suitable temperatures and times may also be employed to form the rigid outer cover 18.

The mold 28 may then be taken out of the oven 36 so that a premix of polyethylene powder, pellets and/or micropellets and a desired amount of a foaming agent may be charged to the mold 28 in a second step of the process. Accordingly, a second step is then employed wherein a desired weight and blend of powdered, pelletized and/or micropelletized polyethylene and a foaming agent is added to the mold 28 inside the interior cavity 30. This combination preferably includes a UV resistant polyethylene material and a closed cell polyethylene material (foaming agent) to produce the foam core 20. The amount of foaming agent employed depends upon the desired thickness of the resultant foam, with an increased amount of foam resulting in a thicker foam product as one skilled in the art would recognize. Inclusion of this second charge of powder and foaming agent is advantageous to ensure good adhesion between the skin layer or cover 18 and the inner foam core 20 and to avoid sagging in the skin layer or cover 18.

Alternatively, the mold 28 may not need to be removed from the oven 36. In this case, the process may be automated to add the blend of powdered and/or pelletized polyethylene and foaming agent to the mold 28.

Referring again to FIG. 4, the mold 28 is coupled to an arm 32 of the rotary molding machine 34 having a heater or oven 36, which heats the mold 28 and thus heats the polyethylene mixture while simultaneously rotating the mold on several axes 38, 39, 40 to ensure proper disposition and bonding of the polyethylene.

The mold may be heated to temperatures preferably in the range of about 525° F. to about 625° F. on the exterior of the mold 28 to produce a temperature preferably in the range of about 380° F. to about 450° F. inside of the mold. The mold 28 may be heated and rotated for a period of approximately 20-30 minutes and then cooled while stationary for approximately 20-30 minutes. Other suitable temperatures and times may also be employed to form the inner core 20.

Additionally, in alternative embodiments, any suitable device for heating and rotating the mold 28 may be employed.

The surfboard is then removed from the mold and allowed to cure before packaging. As mentioned earlier, graphics and decorations may be added in the mold 28 or after the surfboard 10 or main body 12 is molded. Final finishing (e.g. sanding, alignments, etc.) may be needed after molding. The surfboard 10 will then preferably go through quality control and packaging.

There are considerable advantages to the afore-described foamed products, e.g. surfboards, produced by the either the one-shot and two-shot rotational molding methods described above. For example, the advantages of these processes include producing a foamed product with improved mechanical properties, such as rigidity and impact strength. Good thermal insulation properties may also be achieved. It is also possible to recycle a fully integrated polyethylene foamed product. Further advantages include the ability to economically and efficiently form a surfboard using these methods.

Besides the above advantages, the two-shot rotation provides some additional advantages such as the ability to efficiently form a product by using a two-stage process referred to as a Double Drop process. Briefly, and as described above, initial polyethylene powder/pellets may be charged into the mold in accordance with an embodiment of the invention. This material is preferably a linear low-density polyethylene powder. The mold is then heated and rotated, which creates the molded polyethylene shell or cover 18. A machine may then be employed to use a drop box to add the second stage material. Material enters the mold through tubes in the top of the board. This material is preferably microsphere in shape, which enables it to roll and move within the board/shell cavity. The material advantageously contains a foaming or blowing agent that activates the foam. The foamed polyethylene material fills the cavity and once the board is filled it may be removed, cooled and final finished. Accordingly, a final product, such as a surfboard, may be efficiently and economically produced using a two-step active heating process.

Referring now to FIGS. 7-10, there is shown a top plan view of a surfboard 110 in accordance with a second embodiment of the present invention.

Figure 8:
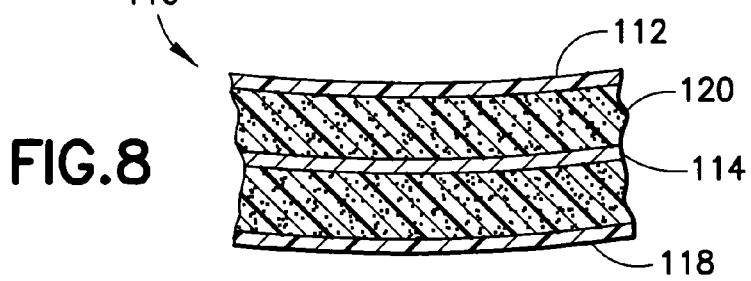
FIG. 8 is a partial cross sectional view of the surfboard shown in FIG. 7.

The surfboard 110 of the second embodiment generally comprises a main body 112 and a strengthening stiffener 114 or stringer located inside the main body 112. The surfboard 110 can also comprise fins 116 which extend from the bottom side of the rear end of the surfboard. The fins 116 can be attached to the main body 112 after the main body 112 is formed. Referring also to FIG. 8, the main body 112 comprises an inner core 120 and an outer shell 118. The outer shell 118 is preferably provided as a polyethylene outer shell. The inner core 120 is preferably provided as an expanded polystyrene core. Thus, the surfboard is primarily a polyethylene/expanded/polystyrene (PEP) surfboard. The surfboard 110 comprises the strengthening stiffener 114. Thus, the surfboard is a stringer strengthened PEP surfboard.

The strengthening stiffener 114, in the embodiment shown, comprises a metal rod which extends the length of the main body 112 and is centered inside the main body 112 between the front and rear of the main body. In an alternate embodiment, the strengthening stiffener could be comprised of wood, plastic, carbon fiber, fiberglass or other suitable material or combinations of materials. In addition, the strengthening stiffener could comprise any suitable shape, and is not limited to a straight rod shape. For example, the strengthening stiffener could have a curved rod shape or could have a general flat two dimensional pattered shape, or even a short height three-dimensional shape. As one example, the strengthening stiffener could comprise a center rod section with branch sections extending from the center rod section. Multiple stringers may also be employed in accordance with the present invention.

As noted above, the surfboard 110 comprises a stringer strengthened PEP surfboard (Polyethylene/Expanded/Polystyrene) having a polyethylene outer shell with an expanded polystyrene core. A PEP surfboard has not been provided in the past because the surfboard and would be too likely to break because of the elongated length of the surfboard. However, with the addition of the strengthening stiffener 114, the present invention allows a PEP surfboard to be manufactured which can withstand the forces encountered during surfing without a substantial likelihood of the surfboard breaking.

Figure 9:
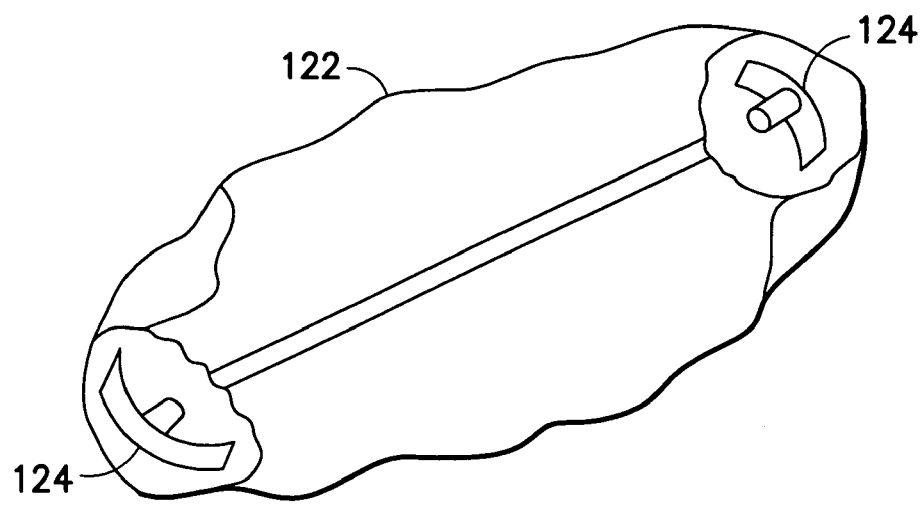
FIG. 9 is a perspective view with cut away sections of a bag having tabs for use in forming the surfboard shown in FIG. 7.
Figure 10:
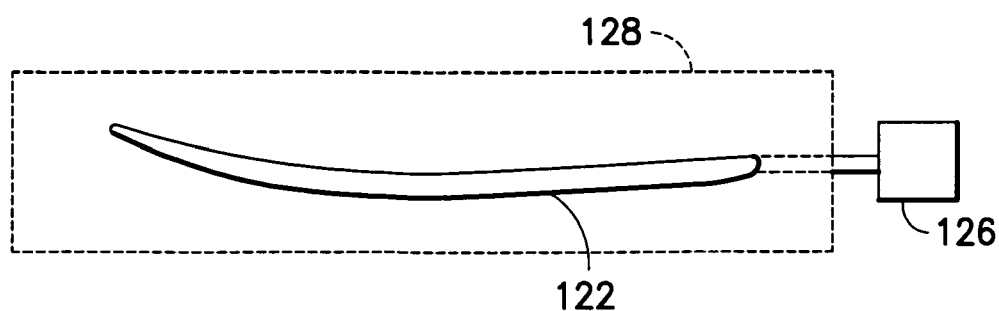
FIG. 10 is a diagrammatic view of a system for heating the bag shown in FIG. 9 and polystyrene balls to form the surfboard shown in FIG. 7.

Referring also to FIGS. 9 and 10, one method of manufacturing the surfboard 10 can comprise the following steps. Polyethylene material can be cut to shape and stitched together to form a bag 122 having a basic surfboard shape. A wood, plastic or other material stringer 114 (see FIG. 7) can be inserted to the basic surfboard bag 122. The bag 122 has tabs 124 sewn into the center in which the stringer 14 is placed. The tabs 124 align the stringer 114 down the center of the bag and down the center of the resulting board. The present invention could also comprise formation of the surfboard without an internal stringer. For example, the surfboard could be formed with an externally mounted strengthening member(s) extending parallel to the longitudinal axis of the surfboard, or alternatively without the addition of an additional strengthening member. An embodiment could also be provided with a stringer that does not extend substantially an entire length of the surfboard 110, such as when at least one of the tabs is suspended from sides of the bag spaced from an end of the bag.

The correct weight of expanded polystyrene balls is added to the polyethylene surfboard shaped bag. The polyethylene bag is then expanded through steam by a steam generator 126 to a surfboard form shape and then properly realigned. The polyethylene bag is then steamed in a mold 128 for about 5 minutes. The surfboard is then removed from the mold 128 and dried for about 8 hours. The surfboard is completed, such as with external markings, and packaged.

With this embodiment of the present invention, the strengthening member is completely encased inside the inner core 20. The bag 22 and tabs 24 form the positioning apparatus for locating the strengthening member inside the bag at a proper position. No additional locating members for locating the strengthening member relative to the bag is needed. With the addition of heat through the steam process, the polystyrene core is formed and the polyethylene outer shell is formed at substantially the same time while also fixedly locating the strengthening member inside the inner core at substantially the same time. The material of the bag 122 melts and bonds with the material which forms the core. Thus, a single heating process is needed to form the surfboard. The step of heating the polyethylene outer shell and the polystyrene inner core simultaneously attaches the strengthening member, thereby eliminating the need for an extra step to attach a strengthening member after the polystyrene inner core is formed. This can obviously save time and money during the manufacturing process.

Features of the present invention could be used to form a surfboard without a stiffener (internal or external stiffener). More specifically, there are known at least two different types of expanded polystyrene (EPS) materials which have different grades and, different strengths and densities after molding. When the stiffener is used with a product, the less expensive grade of EPS (which has a lower strength and density) can be used. The higher grade of EPS can be used without a stiffener because of the higher strength from the more compact density of the material. In both cases, however, it is preferred to use the polyethylene bag, which has a general shape of a surfboard before molding, to receive the loose EPS and then mold the surfboard in a mold with a cavity that has the shape of the surfboard. Thus, features of the present invention can be used to create surfboards with or without an internal stiffener.

It is further noted that in alternative embodiments of the present invention, the stringer or stiffener element 114 or elements may also be incorporated into the surfboard 10 of the first embodiment produced by the above-mentioned roto-molding processes. In certain embodiments for example, the stiffener 114 or stiffeners could be added after the surfboard 10 or main body 12 is molded. In other embodiments, the stiffener 114 or stiffeners could be created during the molding process.

It should be understood that the foregoing description is only illustrative of the invention. Various alternatives and modifications can be devised by those skilled in the art without departing from the invention.

What is claimed is:

1. A method of forming a surfboard using a two-shot rotational molding process comprising:
    adding a first polyethylene material into a mold, said mold having one or more ventilation holes located therein;
    heating the first polyethylene material in the mold while rotating the mold for a pre-determined period of time and at a predetermined temperature to form a skin, said first polyethylene material being in a form comprising at least a powder form, wherein the first polyethylene material forms the skin as substantially solid without any substantial air voids;
    adding a polyethylene mixture into the mold, wherein the polyethylene mixture comprises a blend of a second polyethylene material and a foaming agent, said second polyethylene material being in a form comprising at least a pellet form and/or a micropellet form, wherein the second polyethylene material is the same as the first polyethylene material; and
    heating the polyethylene mixture inside the mold while rotating the mold for a pre-determined period of time and at a predetermined temperature to form a foam core; and
    cooling said mold for a predetermined amount of time wherein either a main body of a surfboard or an entire surfboard is then formed, and wherein the foam core transitions from the skin as a single unit with the skin and made of the same polyethylene material.

2. The method of claim 1, wherein said mold containing said first polyethylene material is rotated about multiple axes while being heated.

3. The method of claim 2, wherein the mold containing said first polyethylene material is heated to a temperature in a range of about 525° F. to about 625° F. on the exterior of the mold to produce a temperature of in a range of about 380° F. to about 450° F. on the inside of the mold, and wherein the mold containing the first polyethylene material is heated and rotated for a period of at least about 20 minutes.

4. The method of claim 1, wherein said mold containing said polyethylene mixture is rotated about multiple axes while being heated.

5. The method of claim 4, wherein the mold containing said combination of said first polyethylene material and said polyethylene mixture is heated to a temperature in a range of about 525° F. to about 625° F. on the exterior of the mold to produce a temperature in a range of about 380° F. to about 450° F. on the inside of the mold, and wherein the mold containing the combination of said first polyethylene material and said polyethylene mixture is heated and rotated for a period of at least about 20 minutes and then cooled while stationary for at least about 20 minutes.

6. The method of claim 1, wherein said first and second polyethylene materials are each an ultra-violet (UV) resistant polyethylene material, said first and second UV resistant polyethylene material include a coloring agent for providing color.

7. The method of claim 1, wherein said mold comprises a general surfboard shape forming an interior cavity, said mold is comprised of a heat conductive material.

8. The method of claim 1, wherein said mold is heated while being rotated using a rotary molding machine having a heating apparatus.

9. The method of claim 1, wherein after said cooling of said mold for said predetermined amount of time then said entire surfboard is formed within said mold, said entire surfboard comprising a main body with one or more fins formed integrally with a portion of the main body of the surfboard.

10. The method of claim 1, further comprising removing said main body from said mold after said main body is formed by said cooling of said mold for said predetermined amount of time, and then removably attaching one or more fins to a portion of the main body to form said entire surfboard outside of said mold.

11. The method of claim 1 further comprising locating at least one surfboard strengthening stringer in the mold, wherein heating the polyethylene mixture forms the foam core at least partially around the stringer.

12. The method of claim 1 wherein the skin and the inner core are integrally formed as a one-piece member made of the same material as two sections with the inner core having air voids and the skin being substantially solid.

13. The method of claim 1 further comprising connecting at least one surfboard strengthening stringer to the surfboard after cooling.

14. A method of forming a surfboard using a two-shot rotational molding process comprising:
    adding a first polyethylene material into a mold, said mold having one or more ventilation holes located therein;
    heating the first polyethylene material in the mold while rotating the mold for a pre-determined period of time and at a predetermined temperature to form a skin, said first polyethylene material being in a form comprising at least a powder form, wherein the first polyethylene material forms the skin as a solid outer section of the surfboard;
    adding a polyethylene mixture into the mold, wherein the polyethylene mixture comprises a blend of a second polyethylene material and a foaming agent, wherein the second polyethylene material is the same as the first polyethylene material, said second polyethylene material being in a form comprising at least a pellet form or a micropellet form;
    heating the polyethylene mixture inside the mold while rotating the mold for a pre-determined period of time and at a predetermined temperature to form a foam core;
    cooling said mold for a predetermined amount of time wherein a main body of a surfboard is formed, wherein the foam core transitions from the skin as a single unit with the skin and made of the same polyethylene material; and
    attaching one or more fine directly to the outer section of the main body to form an entire surfboard after said main body has been formed within said mold by said cooling of said mold for said predetermined amount of time.

* * * * *